M. V. B. CAHOON.
Trolling-Hooks for Mackerel-Fishing.

No. 148,926.  Patented March 24, 1874.

WITNESSES  
Mary J. Utley.  
Geo. E. Upham.

INVENTOR  
Martin V. B. Cahoon  
By Chipman Hosmer & Co  
ATTORNEYS.

UNITED STATES PATENT OFFICE.

MARTIN V. B. CAHOON, OF NEW BEDFORD, MASSACHUSETTS.

IMPROVEMENT IN TROLLING-HOOKS FOR MACKEREL-FISHING.

Specification forming part of Letters Patent No. 148,926, dated March 24, 1874; application filed January 17, 1874.

*To all whom it may concern:*

Be it known that I, MARTIN V. B. CAHOON, of New Bedford, in the county of Bristol and State of Massachusetts, have invented a new and valuable Improvement in Mackerel-Jigs; and I do hereby declare that the following is a full, clear, and exact description of the construction and operation of the same, reference being had to the annexed drawings making a part of this specification, and to the letters and figures of reference marked thereon.

Figure 1:
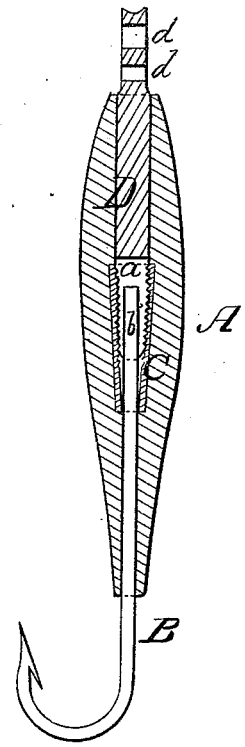
Figure 2:
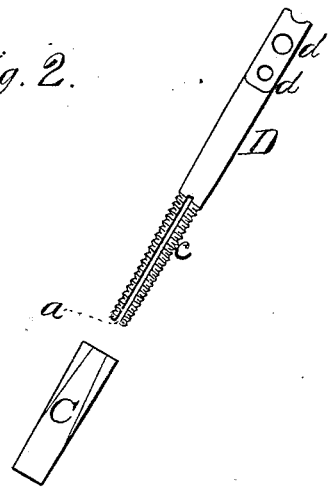

Figure 1 of the drawings is a representation of a sectional view of my mackerel-jig. Fig. 2 is a detail view of the same.

This invention has relation to what is denominated among fishermen as a "mackerel-jig;" and it consists in securing the shank of the hook into the body of the jig by means of a clamping screw-stem and a socket, whereby the shank of a broken hook can be removed from the jig and a new hook substituted, as will be hereinafter explained.

The following is a description of my invention:

In the annexed drawing, A designates the body of the jig, which may be made of the usual well-known shape and material. B is the hook, the shank $b$ of which passes into a hole in the lower end of the body A, and through a socketed piece, C, and is received into a slit made into the screw-threaded portion $c$ of a stem, D. The stem D is perforated at $d\ d$ for the attachment to it of a fishing-line, and this stem is constructed with a slight taper on its split end, so that when it is screwed into the socketed piece C it will clamp firmly the shank of the hook B. The piece C will be cast or otherwise rigidly secured into the body of the jig; and, if its sides are flat, as shown, it will not turn in the jig while screwing into it the stem D.

It will be seen, from the above description, that the hook can be firmly secured into the body of the jig; and, if broken, it can be readily removed and a new hook substituted.

What I claim as new, and desire to secure by Letters Patent, is—

The body A, made of one piece and centrally perforated, having secured therein the tapered socket-piece C, the stem D, and hook B, all constructed and arranged as shown, and for the purpose described.

In testimony that I claim the above I have hereunto subscribed my name in the presence of two witnesses.

MARTIN V. B. CAHOON.

Witnesses:
WENDELL H. COBB,
THOS. J. GIFFORD.